April 16, 1963   H. T. PLEMMONS   3,085,262
BOAT CONSTRUCTION
Filed July 11, 1960
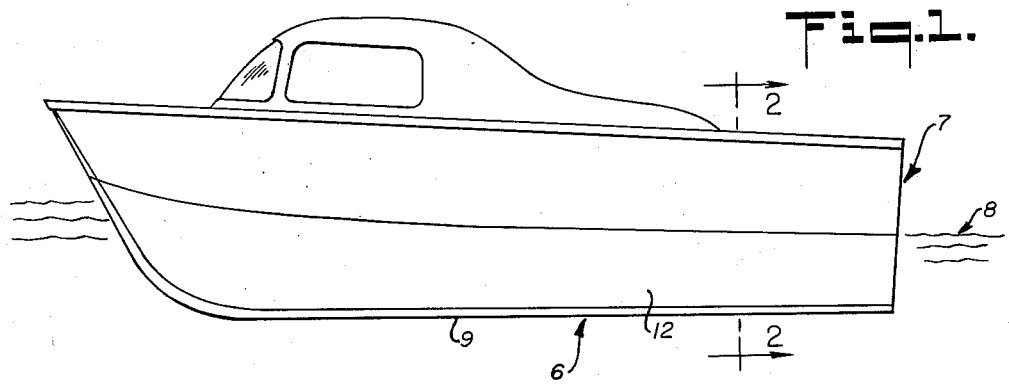
Fig.1.
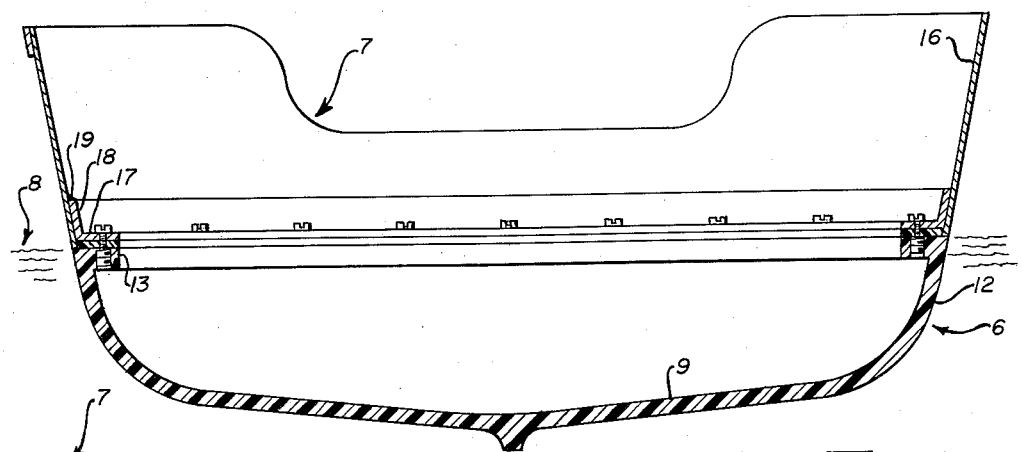
Fig.2.
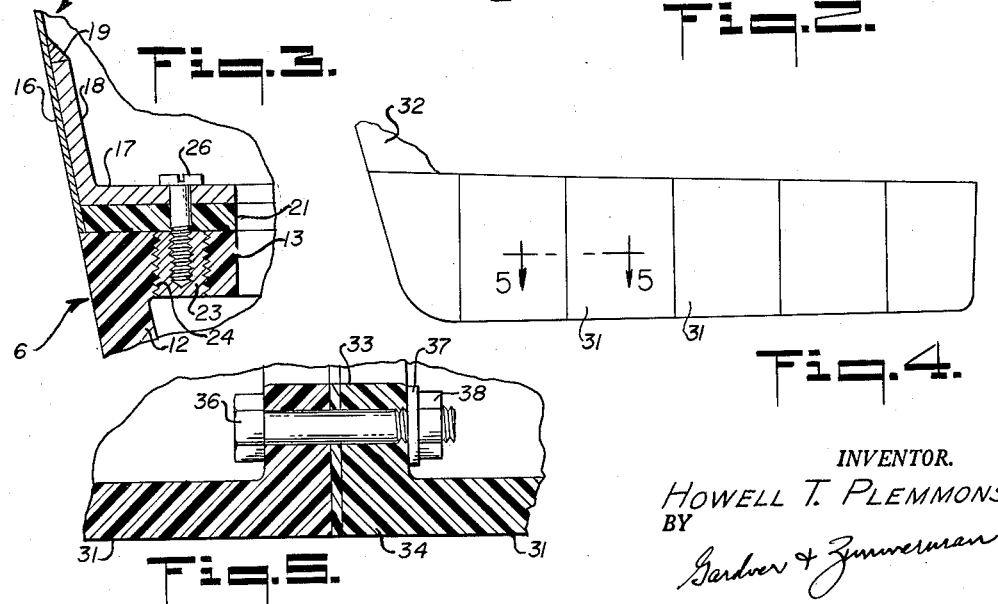
Fig.3.
Fig.4.
Fig.5.
INVENTOR.
HOWELL T. PLEMMONS
BY
*Gardner & Zimmerman*
ATTORNEYS

United States Patent Office 3,085,262
Patented Apr. 16, 1963

3,085,262
BOAT CONSTRUCTION
Howell T. Plemmons, 1167 Inglewood St.,
Hayward, Calif.
Filed July 11, 1960, Ser. No. 41,912
2 Claims. (Cl. 9—2)

This invention generally relates to the art of boat construction, and is more particularly directed towards a boat in which the hull and superstructure positions are formed as distinct integral sections, and of different materials.

In conventional boat design, the hull or portions of the vessel adapted to be disposed within the water are formed of the same general material as that of the portions above the water or superstructure. For most pleasure craft a light weight boat is most desirable and accordingly, in the relatively past few years, light weight materials such as aluminum have been increasingly used for the construction of the vessel. However, the use of these light weight materials has presented several problems, and probably the most important of these is that a light weight hull portion is not particularly resistant to damage such as when the boat strikes a partially submerged obstacle such as a floating log or the like. The impact engagement of a light weight material with such objects frequently results in substantial damage to the hull of the vessel. On the other hand, where the vessel is constructed of a more damage resistant material, the weight of the craft is materially increased, making it difficult to transfer the craft into and out of the water, and likewise requiring increased power. It should also be pointed out that with a light weight vessel constructed entirely of aluminum for example, there is a substantial diminishment in stability of the vessel when moving through the water.

It is accordingly an object of the present invention to provide a boat construction in which the hull is composed of a material different from that of the superstructure and of a substantially heavier and more damage resistant character so that a substantial increase in stability is provided without materially adding to the weight of the vessel.

Another object of the invention is to provide a water craft of the type described in which the heavier material extends to substantially immediately adjacent the water line of the vessel so as not to add materially to the weight of the vessel while protecting the same from damage due to collisions with objects in the water.

Another object of the invention is to provide a boat as above described in which the hull and superstructure may be readily releasably secured together so that the hull may be exchanged or replaced with a minimum of difficulty and without requiring the use of any special equipment and which likewise may be disassembled such as for removal of barnacles or other repair work on the hull.

Yet another object of this invention is to provide a boat having a synthetic hull formed of fiberglass or the like and a light weight superstructure formed of aluminum or other light weight material whereby the aforementioned advantages of relatively light overall weight, increased water stability and a damage resistant hull are provided.

A still further object of the invention is to provide a vessel as above described in which the separable hull may be formed of a plurality of sections releasably secured to each other to provide a unitary structure such as for use on larger boats in which a single molded hull is impractical or impossible to construct.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a side elevational view of a boat constructed in accordance with the teachings of the present invention.

FIGURE 2 is a cross sectional view on an enlarged scale, with the plane of the view being indicated by the line 2—2 of FIGURE 1.

FIGURE 3 is an enlarged view of a portion of the connecting means illustrated in FIGURE 2.

FIGURE 4 is a side elevational view indicating the manner of constructing the hull on a larger vessel.

FIGURE 5 is an enlarged cross sectional view taken substantially in the plane indicated by line 5—5 of FIGURE 4.

As hereinabove described, the boat of the instant invention is of a two-piece construction and as illustrated in FIGURES 1 to 3 of the drawing includes a hull portion 6 and a superstructure portion 7, both of these portions having any particular configuration or design dependent upon the intended purpose and function of the vessel. In accordance with the teachings of the present invention, the hull portion 6 extends substantially to immediately adjacent the water line 8 and means are provided adjacent such water line for releasably securing the same to the superstructure portion so as to provide a liquid tight joint therebetween while still permitting ready assembly and disassembly of the sections. As shown, the hull section 6 is formed of a relatively strong, heavy and damage-resistant material and in this connection it has been found that fiberglass will adequately fulfill these necessary requisites. Thus, the fiberglass hull may be formed of a substantially integral mass including a bottom portion 9 and generally upwardly extending side walls 12. The upper edge of the walls 12, which, as above explained, are disposed substantially immediately adjacent the water line 8, are provided with a preferably integral continuous inwardly directed flange 13 whose function will be presently explained.

With reference to the superstructure 7, the same will be seen to include generally downwardly directed side walls 16 whose lower edge likewise terminates adjacent the water line 8. As in the case of the upper edge of the hull wall 12, the lower edge of the superstructure wall 16 is likewise provided with a continuous inwardly directing flange 17 which is formed as a leg of a length of angle iron 18 or the like suitably welded to the wall 16 as indicated at 19. The flanges 13 and 17 are substantially parallel and coextensive and it will be noted that the flange 17 is spaced slightly upwardly from the lower edge of walls 16 so as to provide a space between the flanges 13 and 17 in which a sealing gasket 21 may be positioned.

As will be best seen in FIGURE 3 of the drawing, the fiber glass hull including the walls 12 and flange 13 is of substantially greater thickness than that of the superstructure wall 16 or the metal flange 17 integrally secured thereto. In order to provide for securing of the respective flanges and consequently the respective portion sections 6 and 7 together, the hull flange 13 is provided with bushings 23 which threadedly engage a plurality of suitably threaded bores 24 disposed in the flange 13 as spaced locations along the length thereof. The threads, for example, interconnecting the bushing to the flange may be left hand threads and the bushing is provided with an upwardly extending threaded bore for the reception of a bolt 26 which extends through apertures in the flange 17 and gasket 21 to engage the bushing bore and thereby secure the flanges together in sealing engagement. Obviously, with a left handed thread connection between the bushing and flange 13, the bolt 26 would be of a right-hand thread construction so that tightening of the bolt would not result in loosening of the bushing in the flange.

In FIGURES 4 and 5 the aforementioned type of connection may be utilized in interconnecting a plurality of hull sections, individually indicated by the numeral 31 to a superstructure section 32. In this case, however, where larger vessels are contemplated, the individual sections 31 must likewise be secured to each other as well as to the superstructure 32 which also may be formed of one or a plurality of sections but in any event corresponding to the superstructure 7 previously described. In this instance, the abutting portions of each of the sections 31 are provided with flanges 33, with a suitable gasket 34 interposed therebetween. Here, by means of a bolt 36, washer 37 and nut 38, the flanges 33 of the respective sections 31 may be releasably secured together transversely of the boat length at the section seams.

From the foregoing description, it will be apparent that with the construction disclosed, the optimum qualities of a vessel may be readily accomplished in that hull protection is adequately provided for by the heavier hull portion, the economy and advantages of light weight construction is provided for by the relatively light weight superstructure, and the means of connecting the sections will result in rapid assembly and disassembly where required.

What is claimed is:

1. A boat of the character described comprising a hull section of relatively heavy fiberglass material and having upstanding side walls terminating adjacent the water line of the boat, a superstructure portion formed of light weight metal including downwardly extending side walls terminating substantially immediately adjacent said water line, flange means extending continuously of each said upwardly and downwardly extending side walls, said superstructure portion and said hull section being directed inwardly thereof in parallel relationship at a position substantially immediately above the water line of the boat, said flange means of the superstructure portion being spaced upwardly from the lower edge of the downwardly extending superstructure side walls to provide a space between said parallel flanges, sealing means interposed in said space with the outer edge thereof disposed adjacent said lower edge of said superstructure and means to clamp the sealing means between the flanges to provide a water tight joint between the hull section and the superstructure.

2. A boat of the character described comprising a hull section of relatively heavy fiberglass material and having upstanding sidewalls terminating adjacent the water line of the boat, a superstructure portion formed of light weight metal, including downwardly extending side walls terminating substantially immedately adjacent said water line, flange means extending continuously of each said upwardly and downwardly extending side walls, said superstructure portion and said hull section being directed inwardly thereof in parallel spaced relationship at a position substantially immediately above the water line of the boat, sealing means interposed in said created space between the flanges, and means to clamp the sealing means between the flanges to provide a water tight joint between the hull section and the superstructure.

References Cited in the file of this patent

UNITED STATES PATENTS

| | | |
|---|---|---|
| 1,846,963 | Grogan | Feb. 3, 1932 |
| 1,848,018 | Maranville | Mar. 1, 1932 |
| 2,251,621 | Van Hoorn | Aug. 5, 1941 |
| 2,376,753 | Bowen | May 22, 1945 |
| 2,834,971 | Harrison | May 20, 1958 |

FOREIGN PATENTS

| | | |
|---|---|---|
| 955,794 | France | July 4, 1949 |